Nov. 13, 1934.  J. A. GIBBONS  1,980,795
METHOD OF PHOTOGRAPHY
Filed Sept. 22, 1931  2 Sheets-Sheet 1
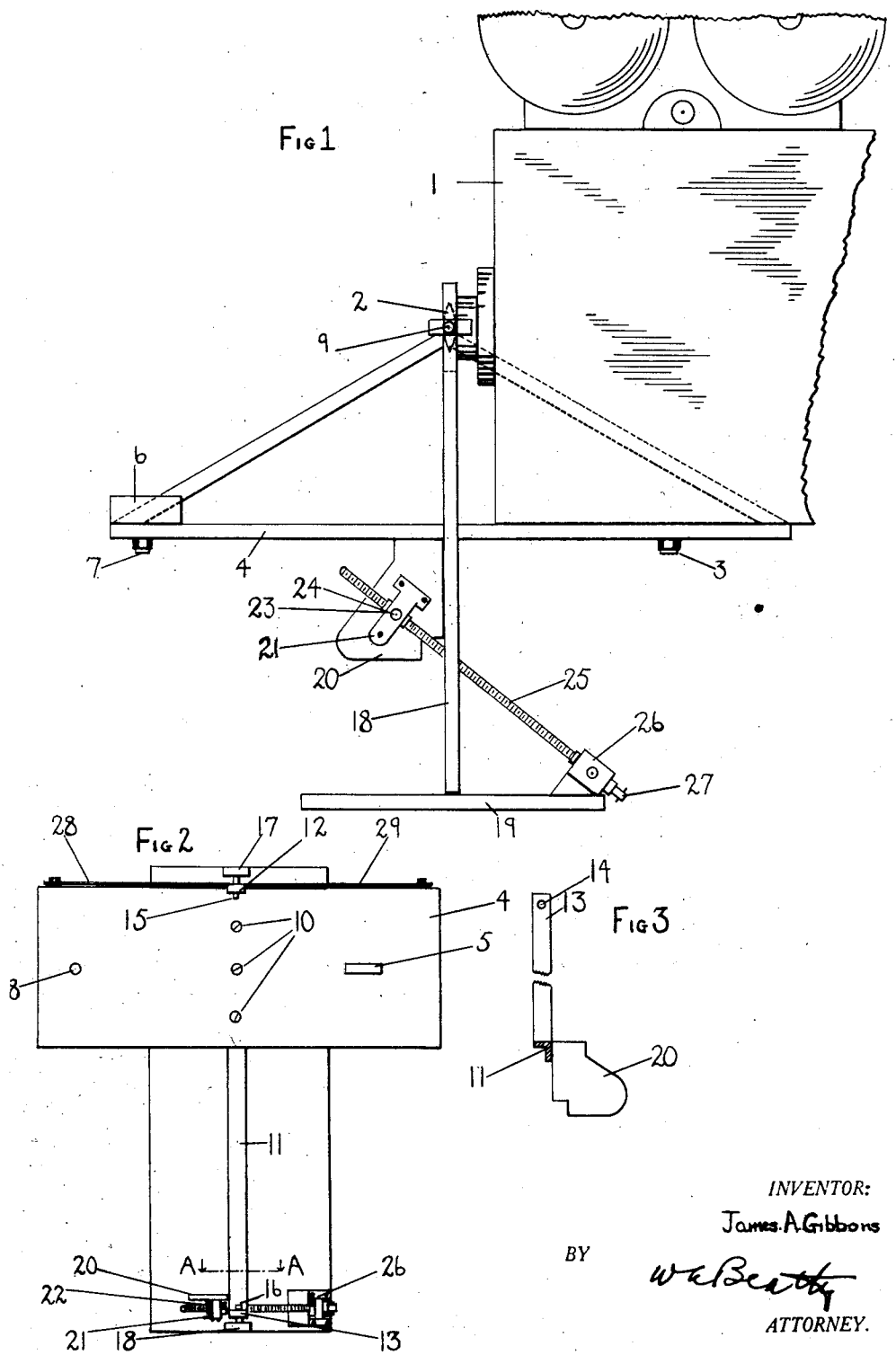
INVENTOR:
James A. Gibbons
BY
W. C. Beatty
ATTORNEY.

Nov. 13, 1934.   J. A. GIBBONS   1,980,795
METHOD OF PHOTOGRAPHY
Filed Sept. 22, 1931   2 Sheets-Sheet 2

INVENTOR:
James A. Gibbons
BY
W E Beatty
ATTORNEY.

Patented Nov. 13, 1934

1,980,795

UNITED STATES PATENT OFFICE 1,980,795

METHOD OF PHOTOGRAPHY

James A. Gibbons, North Hollywood, Calif., assignor to Warner Bros. Pictures, Inc., New York, N. Y., a corporation of Delaware Application September 22, 1931, Serial No. 564,279

3 Claims. (Cl. 88—16)

This invention relates to a method of photography and has for an object to overcome a certain defect which has been encountered when tilting a camera to photograph a composite set, comprising a miniature set, which is relatively close to the camera, and a complementary full-sized set located at some distance from the camera. In this case, when the optical axis of the camera is horizontal, the bottom of the miniature set is in optical alinement with the complementary top of the full-sized set, and both of them are in the horizontal optical axis of the camera.

When tilting an ordinary motion picture camera to photograph from the top of the miniature set to the bottom of the full-sized set, it has been found that the bottom of the miniature set does not permit a perfect match with the top of the full-sized set, for the reason that the lens in the camera moves, with respect to the optical axis above described, as the camera is tilted. I have discovered that this is due to the fact that the top of the full-sized set and the bottom of the miniature set do not remain in optical alinement as the camera is tilted.

I have discovered that this defect can be overcome by tilting the camera about an axis passing substantially through the lens of the camera and at right angles or across the optical axis of the lens. This prevents any undesirable overlapping of the bottom of the miniature and the top of the full-sized set.

For further details of the invention, reference may be made to the drawings, in which Fig. 1 is a side elevation of a camera mount, as above described;

Fig. 2 is a plan view on a smaller scale of the camera mount in Fig. 1, with the camera and certain other parts removed;

Fig. 3 is a section on line A—A of Fig. 2, looking in the direction of the arrows, and with certain parts removed.

Figure 4:
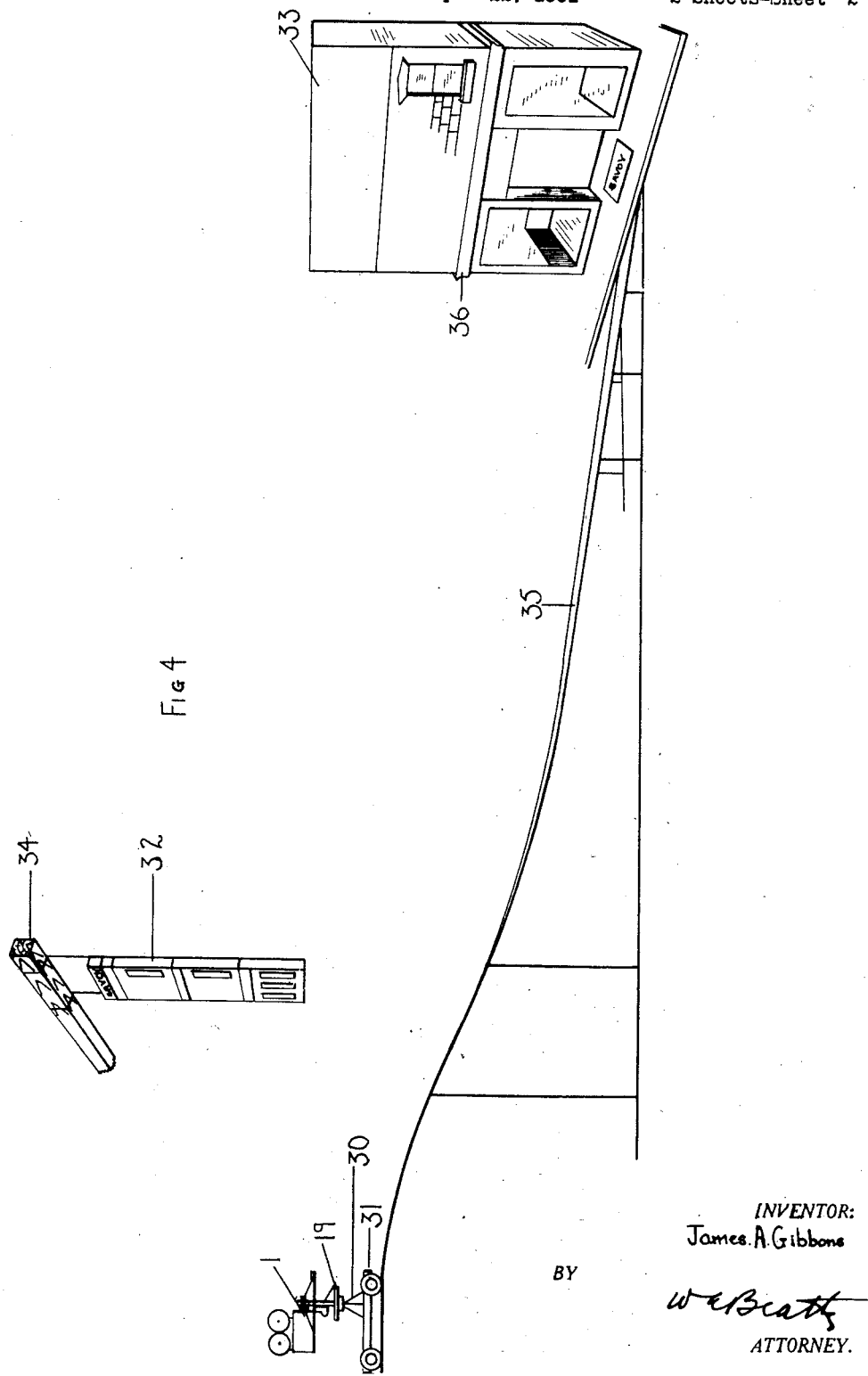
Fig. 4 diagrammatically represents the use of the invention for photographing the front of a building which is partially in miniature and the remainder full sized.

Referring in detail to the drawings, the camera 1 is provided with the usual lens 2 shown in dotted lines. The camera is fastened by means of a bolt 3 to the platform 4. The bolt 3 extends through the slot 5 in the platform 4 and fits into the usual threaded aperture (not shown) in the base of the camera 1. A counter-weight 6 is provided for the camera and is fastened to the end of platform 4 opposite the camera by means of bolt 7 passing through aperture 8.

The platform 4 is mounted to rotate about the horizontal axis 9 of the lens 2 in the following way: the platform 4 is fastened, for example, by machine screws 10 to the horizontally extending bar 11 shown in Fig. 2 and in section in Fig. 3. Welded, or otherwise fastened to the opposite ends of the bar 11, are two upright bars 12 and 13, each provided at its upper end with an aperture corresponding to the aperture 14 in Fig. 3, in order to receive the studs 15 and 16, respectively, which are carried by the upright arms 17 and 18, respectively. The studs 15 and 16 rotatably support the apertured bars 12 and 13, respectively, whereby the platform 4 is likewise rotatable. In other words, the two upright bars 12 and 13 are connected to the horizontal bar 11 to form a U-shaped cradle, to the bar 11 of which the platform 4 is fastened. The vertical bars or bearing supports 17 and 18 are welded, or otherwise fastened to and arise from the base plate 19 which supports the whole structure.

In order to tilt the camera 1 to any desired angle, the following means are provided: the plate 20 shown in Fig. 3 is welded, or otherwise fastened, to the horizontal bar 11. The plate 20 carries bearing plates 21 and 22 in which a threaded nut 23 is swiveled, the threaded nut 23 being provided with oppositely extending shafts, one of which 24 is shown as extending through the correspondingly shaped circular bearing in the plate 21. Threaded into nut 23 is a screw 25 mounted on the base 19 by the swivel connection 26. The end of screw 25 is provided with a key 27 so that it may engage a suitable tool for turning it. It will be apparent, therefore, that on turning the key 27 the screw 25 will rotate the platform 4 and the camera carried thereby, the camera rotating as above described in the horizontal axis of the lens 2.

In order to steady the platform 4, struts 28 and 29 suitably fastened to the platform 4 and to the upright 12 may be provided.

The swivel connection 26 and the similar swivel mounted on plate 20 permit the necessary angular movement of the screw 25 in a vertical plane as the platform 4 is tilted to different positions.

As an example of one use for the invention, reference may be made to Fig. 4, wherein the camera 1, supported as illustrated in Figs. 1 to 3, inclusive is mounted on a tripod 30, which is carried by a dolly 31. The camera is here illustrated as being tiltable to photograph the front of a building, the part 32 of which is in miniature and the remainder 33 full sized. The miniature 32 is suitably supported and may, for example, be hung from an overhead beam 34. The size of the miniature 32 is determined by bearing in mind that its size bears the same relation to the size of the full-sized set 33 that the distance from the camera to the miniature bears to the distance from the camera to the full-sized set. The bottom of the miniature 32 is in line with the top of the set 33, and both of these are in line with the horizontal optical axis of the camera 1 in the position shown and preparatory to taking the "shot". The dolly 31 is supported on a runway 35 along which the dolly is adapted to travel to make a running "shot" of the set 33 after being tilted to photograph the miniature 32. With the parts as described in Fig. 4, the dolly is held in a fixed selected position in front of the sets 32 and 33, and while the dolly remains in this fixed position, the camera 1 is tilted in the axis of the lens to photograph the set 32 from the top to the bottom thereof; whereupon, the dolly 31 is moved along the track 35 to make a running "shot" of the set 33. By thus photographing the sets 32 and 33, the resulting picture will appear as though it had been taken of a full-sized building throughout, and the bottom of the miniature 32 will not overlap the top of set 33 as would be the case if an ordinary camera were used, as above described.

For example, if an ordinary camera were used, this camera, being tilted from the top of set 32 to the bottom of set 33, the lens of that camera would move with respect to the horizontal axis passing through the bottom of these two sets. In this case, as the camera is tilted downwards, when the lens is above the horizontal axis referred to, the bottom of set 32 will conceal a portion of the top of set 33, and as the camera is tilted downward to a greater extent, the camera will photograph an increasing amount of this concealed portion of the top of set 33 as the lens of the camera approaches the horizontal axis. The resulting picture will appear unnatural as it will show a decreasing amount of the top of set 32 and an increasing amount of the top of set 33. Furthermore, when the lens of the ordinary camera reaches a point below the horizontal axis, that portion of the top of set 33 above the horizontal axis will come into the field of view of the camera. This is objectionable, as it is desirable to hide the joining line at the bottom of the miniature and the top of set 33 by appropriate scenery such as a coping, or the like, in the case illustrated. This coping is very narrow in comparison to the whole field of view of the camera, and it is undesirable to have the lens of the camera photograph sections of the top of a set such as 33 both above and below this coping. In order to make it clear in Fig. 4 that the top of set 33 is in line with the bottom of set 32, this coping has been omitted, but it will be readily understood that a coping such as illustrated at 36 may be employed for the purpose stated, either at the top of set 33 or at the bottom of set 32, in order to hide in the photograph the joining line between the top of set 33 and the bottom of set 32.

It will be apparent that various modifications may be made in the invention within the scope of the following claims. For example, the set 32 may be supported from the floor, instead of from the ceiling. Furthermore, the sets shown in Fig. 4 need not represent a building and may be any other desired sets. Also, a portable track (not shown) may connect the runway 35 with the interior of set 33, so that the dolly 31 may be led to the interior of this set, where a suitable interior scene may be photographed. These, and other modifications, are within the purview of my invention. Furthermore, by placing the camera and its mounting on its side, the camera may be employed to photograph two horizontally disposed miniature and full-sized sets, whereby the vertical joining line therebetween will not be mismatched.

I claim:

1. The method which comprises positioning a motion picture camera in front of relatively spaced miniature and full-sized sets, with the edges of said sets and the axis of the lens of the camera substantially in alignment, the size of the miniature bearing the same relation to the size of the full-sized set that the distance from the camera to the miniature bears to the distance from the camera to the full-sized set, tilting the camera about a horizontal axis passing through its lens to scan the miniature and the full-sized set, and actuating the camera to expose the film therein while the camera is being thus tilted, thereby blending the photograph of the bottom of said miniature set with the photograph of the top of said full-sized set.

2. The method according to claim 1 which comprises continuing said actuation of said camera while moving said camera from a position in front of said miniature set to a position behind said miniature set and in front of said full-sized set.

3. Photographic arrangement comprising the combination of an elevated miniature set and a complementary full-sized set, said sets being arranged at different levels, and at positions horizontally spaced apart, a motion picture camera for photographing said sets, means for supporting said camera for tilting movement about a horizontal axis passing through the lens of said camera, a dolly for said camera thus supported, and an elevated track for said dolly and extending underneath said miniature set for guiding said camera from a position in front of both of said sets where the horizontal axis of said lens is substantially in alignment with the bottom of said miniature set and with the top portion of said full-sized set, said track being adapted to guide the camera from said position, underneath said miniature set, to a position behind said miniature set and adjacent said full-sized set.

JAMES A. GIBBONS.